May 8, 1945.  R. H. CLARKE  2,375,524
REVERSING GEAR AND CLUTCH MECHANISM
Filed Oct. 5, 1943    2 Sheets-Sheet 1
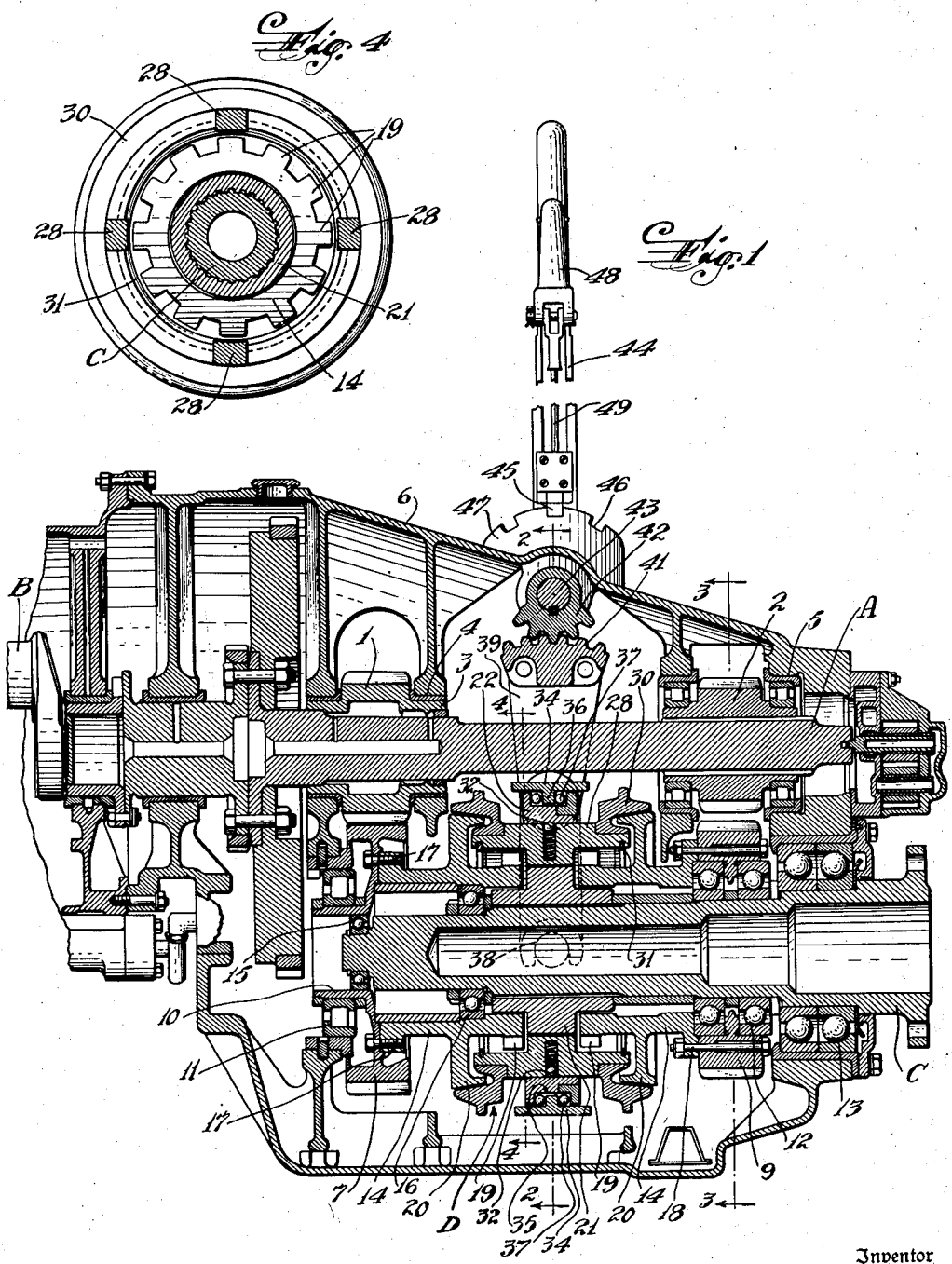
Inventor
Robert H. Clarke
By
Harry B. Rook
Attorney May 8, 1945. R. H. CLARKE 2,375,524
REVERSING GEAR AND CLUTCH MECHANISM
Filed Oct. 5, 1943 2 Sheets-Sheet 2
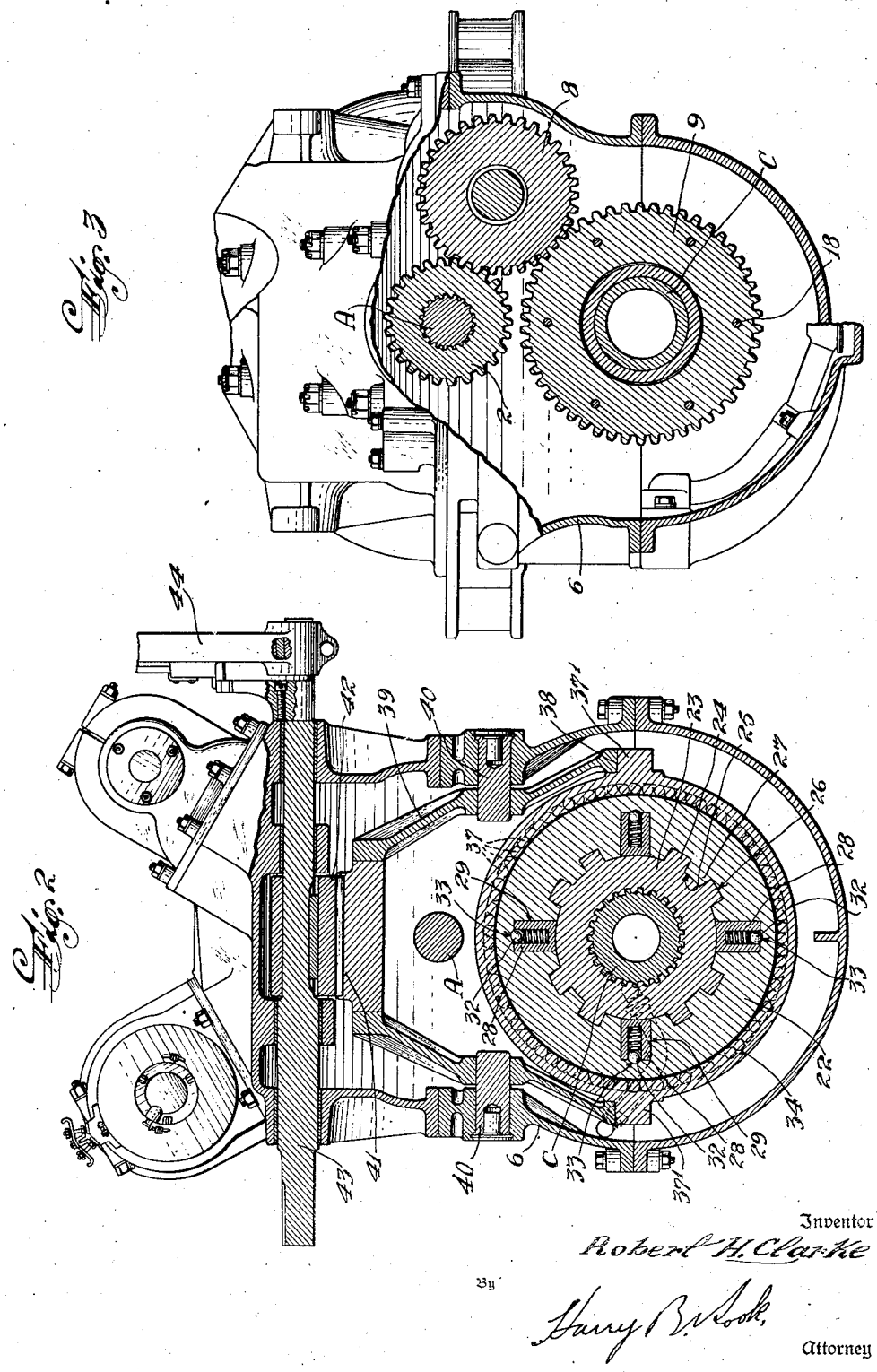
Inventor
Robert H. Clarke
By
Harry B. Cook,
Attorney Patented May 8, 1945

2,375,524

UNITED STATES PATENT OFFICE 2,375,524

REVERSING GEAR AND CLUTCH MECHANISM

Robert H. Clarke, Nutley, N. J.

Application October 5, 1943, Serial No. 505,008

2 Claims. (Cl. 74—377)

This invention relates in general to power transmitting mechanism including a reversing gear and a novel and improved clutch for connecting and disconnecting a driving shaft and a driven shaft, and more particularly the invention contemplates a mechanism of this character especially adaptable to marine service.

In clutch and reversing gear mechanisms for many purposes, especially where high power is being transmitted and connections between the driving shaft and the driven shaft must be made suddenly, it is desirable that a positive or toothed clutch be provided for transmitting power from the driving shaft to the driven shaft.

For example, in a motor boat, particularly landing barges that are used currently in military and naval operations, it is necessary frequently to reverse quickly the direction of travel. When the clutch is operated to disconnect the driving shaft from the propeller shaft, the latter continues to be driven by the action of the water on the propeller under the momentum of travel of the boat, and when the clutch is operated to reverse the drive, it is subjected to severe shocks and strains.

One object of my invention is to provide a mechanism of the general character described which shall comprise a novel and improved construction and combination of forward and reverse driving gears, a positive clutch for transmitting power from a driving shaft to a driven shaft selectively through said forward and reverse driving gears, and means for protecting said clutch against excessive strains and shocks during reversals of the drive.

Another object is to provide such a mechanism wherein the means for protecting said positive clutch against excessive strains and shocks shall comprise an auxiliary friction clutch mechanism for connecting the driving shaft to the driven shaft and causing approximate synchronization of the speed of rotation of the two shafts prior to the "throwing in" or engagement of the cooperating parts of the positive clutch, so that the cooperatively interlocking parts of the positive clutch that are connected respectively to the driving shaft and the driven shaft, shall be rotating at approximately the same speed when they are moved into engagement with each other.

Further objects are to provide a novel and improved construction and combination of a positive clutch having two coaxially rotatable parts positively interlocking, and an auxiliary synchronizing clutch having two parts to frictionally engage each other and each coaxial with and connected to one of said parts of said positive clutch to rotate therewith, and means for causing frictional engagement of said parts of the synchronizing clutch prior to the interlocking of said parts of the positive clutch; and to provide novel and improved means for actuating said synchronizing clutch parts into engagement and thereafter causing interlocking of said positive clutch parts.

Other objects are to provide in such a mechanism novel and improved means for maintaining the parts of both said clutches in neutral position or disengaged from each other; to provide a reversing gear and clutch mechanism which shall be compact and light in weight and at the same time capable of transmitting high power; and to obtain other advantages and results that will be brought out by the following description in conjunction with the accompanying drawings in which Figure 1 is a vertical longitudinal sectional view through the reversing gear and clutch mechanism embodying my invention.

Figure 2 is a transverse vertical sectional view on the line 2—2 of Figure 1.

Figure 3 is a similar view on the line 3—3 of Figure 1, and

Figure 4 is a fragmentary transverse vertical sectional view on the line 4—4 of Figure 1.

Specifically describing the illustrated embodiment of the invention the reference character A designates the driving shaft which is adapted to be connected to any suitable source of power such as the crank shaft B of an internal combustion engine. A forward driving pinion 1 and a reverse driving pinion 2 are mounted on the driving shaft A to rotate therewith, and as shown said pinions have feather and spline connections with the shaft. As shown, the pinions 1 and 2 have bearing hubs 3 which are journaled in suitable bearings 4 and 5 in a casing 6 whereby the driving shaft A is also journaled in the casing.

The forward driving pinion 1 directly meshes with a pinion 7 that is loosely rotatably mounted with respect to the driven shaft C. The reverse driving pinion 2 directly meshes with an idler pinion 8 (see Figure 3) which in turn meshes with a gear 9 that is loosely rotatably mounted with respect to the driven shaft C. As shown, the gear 7 has a bearing hub 10 that is journaled in bearings 11 in the casing 6 while the gear 9 is journaled by bearings 12 upon the driven shaft C which in turn is journaled in bearings 13 in the casing 6 in spaced relation to the bearing 11. Also a bearing 15 is provided between the shaft C and the hub 10 of the gear 7. Thus the shaft C is journaled in the casing in the bearings 11, 15 and 13 and the gears 7 and 9 are rotatably mounted on the driven shaft.

The forward driving gear 7 and the reverse driving gear 9 can be selectively connected and disconnected to and from the driving shaft by a clutch mechanism generally designated D. As shown, each gear 7 and 9 has rigidly connected to the side thereof adjacent the other gear and coaxial therewith, a clutch sleeve 14. A bearing 16 is interposed between the driven shaft C and the clutch sleeve 14 on the forward driving gear 7. As shown, one end of one clutch sleeve 14 is connected to the gear 7 by cap screws 17, while one end of the other clutch sleeve is connected to the gear 9 by bolts 18.

The clutch sleeves 14 are in spaced relation to each other and the outer end of each has a positive clutch element in the form of radial teeth 19. Inwardly of the teeth 19, each clutch sleeve has connected thereto a friction clutch element 20. Preferably the element 20 comprises a drum having a friction surface in the form of the frustrum of a cone.

A hub 21 is mounted on the driven shaft C to rotate therewith, as by a feather and spline connection, and has a portion located between the ends of the clutch sleeves 14 and in spaced relation thereto, and mounted on said hub is a shiftable member 22 which carries a positive clutch element to cooperate with each positive clutch element 19 and a friction clutch element to cooperate with each friction clutch element 20. The shiftable member 22 is mounted to rotate with the hub 21 but to move longitudinally thereof and coaxially with the driven shaft C, and as shown, the outer periphery of the hub 23 has alternately arranged teeth and grooves 24 and 25 while the inner periphery of the shiftable member 22 has alternately arranged grooves and teeth 26 and 27 interlocking respectively with the teeth and grooves on the hub. The teeth and grooves at opposite ends of the shiftable member form the positive clutch elements to cooperate with the teeth on the respective clutch sleeves 14 for engaging the positive clutches. With this construction it will be observed that the shiftable member 22 is in effect a collar on the hub 21 and may slide longitudinally in each of opposite directions so as to selectively engage and disengage the teeth and grooves on the collar with the teeth and grooves on the clutch sleeves 14.

A plurality of brackets 28 are spaced circumferentially of the collar 22 and slidable longitudinally thereof with their ends projecting from opposite sides of the collar. More particularly the collar has a plurality of circumferentially spaced grooves 29 on its inner periphery in each of which one of the brackets 28 is slidably mounted. A friction clutch ring element 30 is rigidly connected to the projecting ends of said brackets at each side of the collar, each of the clutch ring elements having an interior frusto-conical surface to cooperatively frictionally engage the frusto-conical surface of one of the clutch drum elements 30. Preferably the brackets 28 are also connected at their ends by split spring rings 21 which are seated in grooves in the bracket elements at the sides thereof opposite the clutch ring elements 30. With this construction, it will be observed that two clutch ring elements 30 are rigidly connected together by the brackets and that there may be relative movement between the shiftable collar 22 and the clutch ring elements.

The positive clutches and the friction clutches are related to each other so that one friction clutch and one positive clutch will be engaged in succession; in other words, the clutch ring 30 and the corresponding clutch drum 20 of one friction clutch will first be brought into engagement with each other and then the positive clutch teeth at one end of the shiftable collar 22 will be brought into engagement with the clutch teeth of the corresponding clutch sleeve 14. It will thus be seen that when the shiftable collar 22 is moved in either direction, one of the friction clutches will be engaged so as to connect the corresponding gear 7 or 9 with the driven shaft C and cause the latter to rotate in approximate synchronism with the gear before the corresponding positive clutch is engaged.

In accordance with the invention, means is provided for normally causing the brackets 28 and the friction clutch elements to move with the shiftable collar 22 until one of the friction clutches is engaged and thereafter to permit said collar to continue movement in the same direction relative to the friction clutch elements so as to engage the corresponding positive clutch. As shown, such means may comprise a spring pressed ball 32 in one or more of the brackets 28 which normally seats in a shallow socket or recess 33 in the collar 22 at the base of the corresponding groove 29. The ball 32 is yieldingly pressed into the socket 33 with sufficient pressure to permit the proper engagement of the friction clutches by movement of the shiftable collar 22, but after such engagement the force actuating the shiftable collar will overcome the spring pressure on the ball 32 and permit the collar to continue to move in the same direction relatively to the friction clutch elements 30.

It will thus be understood that with this construction it is possible to cause approximate synchronization of the speed of rotation of the two elements of the positive clutches prior to the "throwing in" or engagement of said positive clutch elements. In this way the positive clutches are protected against excessive strains and shocks during engagement and disengagement, and this is especially important in marine transmission mechanisms where sudden reversals of the drive frequently are necessary.

The invention also contemplates means for shifting or actuating the shiftable collar 22 and for holding said collar in neutral position, that is, when all of the clutches are disengaged. As shown, this means includes a slip ring 34 which surrounds the collar 22 for rotation relatively thereto. Conveniently the outer periphery of the shiftable collar 22 may have a recess 35 and the inner periphery of the slip ring 34 may have a circumferential rib 36 which projects into said recess, and a row of balls 37 may be arranged between the rib 36 and the side walls of the recess 35. The slip ring has diametrically opposite trunnions 37 which are engaged respectively by the notched ends 38 of the arms of a bifurcated clutch actuating lever 39 which is pivotally mounted intermediate its ends at 40 in the casing 6. It will be observed that when the lever 39 is oscillated about its pivotal connections 40, the slip ring 34 will exert a pushing action on the shiftable collar 22 to slide it on the hub 21, the rows of balls 37 constituting in effect thrust bearings, and at the same time the collar 22 may rotate relatively to the slip ring.

For operating the clutch actuating lever 39 I may connect a gear segment 41 to the end of the lever 39 opposite the trunnions 37 and mount a mutilated gear 42 on a shaft 43 to mesh with the gear segment so that upon rotation of the shaft 43 the clutch actuating lever 39 will be oscillated. A hand lever 44 may be connected to the shaft 43 for rotating the latter, and preferably a detent 45 is mounted on the lever to cooperate with notches 46 in a detent segment 47. The detent 45 may be of the usual construction, being influenced into the notches 46 by a spring and being releasable from the notches by lever 48 mounted on the hand lever 44 and connected to the detent by a pull rod 49. When the detent 45 is in the middle notch 46 all of the clutches will be held positively in neutral position. The two side notches 46 are provided to cooperate with the detent 45 for holding the positive clutches engaged with the forward and reverse driving gears 7 and 9 respectively.

From the foregoing it will be seen by those skilled in the art that my invention provides a compact reversing gear and clutch mechanism which is light in weight and at the same time is capable of transmitting high power without excessive strains and shocks during reversals of the drive. The capability of the synchronizing clutches to transmit high power is especially important where the transmission is used for marine service.

While I have shown and described the invention as embodied in certain details of construction it will be understood that the construction of the reversing gear and clutch mechanism may be widely modified and changed within the spirit and scope of the invention.

Having thus described my invention, what I claim is:

1. Clutch mechanism for two coaxially relatively rotatable parts one of which is a gear, said mechanism comprising a clutch sleeve rigidly connected at one end to one side of said gear, a positive clutch element having teeth at the outer end of said sleeve, a friction cone clutch drum element rigidly connected to said clutch sleeve inwardly of said positive clutch teeth, a shiftable member mounted on the other of said parts to rotate therewith and to move longitudinally thereof coaxially with said gear, said member carrying a positive clutch element having teeth to cooperate with said positive clutch element on said clutch sleeve, a friction cone clutch ring element to cooperate with said clutch drum element on said clutch sleeve, brackets spaced circumferentially of said shiftable member and slidable therein with their ends projecting from one side thereof, said clutch ring element being rigidly mounted on said projecting ends of said brackets, said clutches being relatively arranged so that upon shifting of said member in either direction said friction clutch and said positive clutch will be engaged in succession, and means yieldingly connecting at least one of said brackets to said member to cause said clutch ring element to move with said shiftable member until said friction clutch is engaged and thereafter to permit said member to continue movement in the same direction relatively to said clutch ring so as to engage the positive clutch, and mechanism for shifting said member.

2. Reversing clutch mechanism, comprising a shaft, a pair of gears spaced apart and rotatably mounted on said shaft, means for rotating said gears in reverse directions, a clutch sleeve connected to each gear and projecting toward the other gear, a positive clutch element having exterior radial teeth at the outer end of each said clutch sleeve and a friction cone clutch drum element rigidly connected to each said clutch sleeve inwardly of said positive clutch teeth, a hub mounted between said clutch sleeves on said shaft to rotate therewith, a collar mounted on said hub to rotate therewith and to move longitudinally thereof, said collar having interior teeth constituting a positive clutch element complemental to both the positive clutch elements on said gear sleeves, friction cone clutch ring elements each complemental to the friction clutch element on one of said gear sleeves, brackets spaced circumferentially of said collar and slidable therein with their ends projecting from opposite sides thereof, one of said friction cone clutch ring elements being rigidly mounted on said projecting ends of said brackets at each side of said collar, said clutches being relatively arranged so that upon shifting of said collar in either direction one of said friction clutches and one of said positive clutches will be engaged in succession, and means yieldingly connecting at least one of said brackets to said collar to cause said clutch ring elements to move with said collar until one of said friction clutches is engaged and thereafter to permit said collar to continue movement in the same direction relatively to said clutch ring elements so as to engage the corresponding positive clutch, and mechanism for shifting said collar.

ROBERT H. CLARKE.